(12) United States Patent
Kiribayashi (10) Patent No.: US 7,796,017 B2
(45) Date of Patent: Sep. 14, 2010

(54) CAPACITANCE TYPE SEAT OCCUPANT SENSOR SYSTEM

(75) Inventor: Shinichi Kiribayashi, Anjo (JP)

(73) Assignee: Denso Corporation, Kariya (JP)

( * ) Notice: Subject to any disclaimer, the term of this patent is extended or adjusted under 35 U.S.C. 154(b) by 276 days.

(21) Appl. No.: 11/977,139

(22) Filed: Oct. 23, 2007

(65) Prior Publication Data

US 2008/0100425 A1 May 1, 2008

(30) Foreign Application Priority Data

Oct. 31, 2006 (JP) ............................. 2006-296529

(51) Int. Cl.
    *B60Q 1/00* (2006.01)
(52) U.S. Cl. ................. 340/425.5; 340/457.1; 340/438; 340/562; 340/561; 340/540; 340/500; 701/45; 280/735; 280/734
(58) Field of Classification Search .............. 340/425.5, 340/457.1, 438, 562, 561, 541, 540, 500; 701/45; 280/735, 734
See application file for complete search history.

(56) References Cited

U.S. PATENT DOCUMENTS

| | | | |
|---|---|---|---|
| 5,964,478 A | 10/1999 | Stanley et al. | |
| 6,025,711 A * | 2/2000 | Demma et al. | 324/207.26 |
| 6,220,627 B1 | 4/2001 | Stanley | |
| 6,283,504 B1 | 9/2001 | Stanley et al. | |
| 6,290,255 B1 | 9/2001 | Stanley et al. | |
| 6,302,438 B1 | 10/2001 | Stopper, Jr. et al. | |
| 6,335,684 B1 | 1/2002 | Eisenmann et al. | |
| 6,348,862 B1 | 2/2002 | McDonnell et al. | |
| 6,378,900 B1 | 4/2002 | Stanley et al. | |

(Continued)

FOREIGN PATENT DOCUMENTS

DE 197 24 168 8/1998

(Continued)

OTHER PUBLICATIONS

Office Action dated Mar. 19, 2008 in German Application No. 10 2007 051 827.9 with English translation.
Office Action dated Jul. 28, 2009 in corresponding German Application No. 10 2007 051 827.9.

*Primary Examiner*—Brian A Zimmerman
*Assistant Examiner*—Kevin Lau
(74) *Attorney, Agent, or Firm*—Harness, Dickey & Pierce, PLC (57) ABSTRACT

A capacitance type seat occupant sensor system of a vehicle includes an AC electric power source, a main electrode disposed at a seat of the vehicle to form an electric field between the main electrode and the body of the vehicle, a guard electrode disposed between a seat frame and the main electrode, a switch unit for establishing connection of the guard electrode to have the same potential as the main electrode to provide a seat occupant sensing mode, an impedance calculating unit for calculating an impedance of a sensing circuit based on the AC voltage and an amount of current flowing through the sensing circuit, a real-part-and-imaginary-part calculating unit and judging unit for discriminating an occupant on the seat based on at least the imaginary part of the first impedance. The impedance calculating unit calculates a first impedance of an electric circuit including the main electrode when the switch means provides the seat occupant sensing mode, and the real-part-and-imaginary-part calculating unit calculates the real part and the imaginary part of the impedance.

20 Claims, 11 Drawing Sheets

U.S. PATENT DOCUMENTS

| | | |
|---|---|---|
| 6,392,542 B1 * | 5/2002 | Stanley ................. 340/561 |
| 6,392,857 B1 * | 5/2002 | Leitloff et al. ............. 361/80 |
| 6,445,294 B1 | 9/2002 | McDonnell et al. |
| 6,517,106 B1 | 2/2003 | Stanley et al. |
| 6,520,535 B1 | 2/2003 | Stanley et al. |
| 6,563,231 B1 | 5/2003 | Stanley et al. |
| 6,577,023 B1 | 6/2003 | Stanley et al. |
| 6,598,900 B2 | 7/2003 | Stanley et al. |
| 6,703,845 B2 | 3/2004 | Stanley et al. |
| 6,825,765 B2 | 11/2004 | Stanley et al. |
| 7,098,674 B2 | 8/2006 | Stanley et al. |
| 7,180,306 B2 | 2/2007 | Stanley et al. |
| 7,271,730 B2 | 9/2007 | Kimura et al. |
| 2005/0228597 A1 * | 10/2005 | Giurgiutiu et al. ............ 702/35 |
| 2005/0275202 A1 | 12/2005 | Wato et al. |
| 2006/0164254 A1 | 7/2006 | Kamizono et al. |
| 2007/0029768 A1 | 2/2007 | Clos et al. |
| 2007/0159178 A1 | 7/2007 | Stanley et al. |
| 2007/0194900 A1 * | 8/2007 | Hawkins et al. .......... 340/457.1 |

FOREIGN PATENT DOCUMENTS

| | | |
|---|---|---|
| EP | 1 034 412 | 9/2000 |
| EP | 1 048 534 | 11/2000 |
| JP | 11-271463 | 10/1999 |
| JP | 2002-036929 | 2/2002 |
| JP | 2002-139468 | 5/2002 |
| JP | 2006027591 A * | 2/2006 |
| WO | WO 97/28989 | 8/1997 |

* cited by examiner

CAPACITANCE TYPE SEAT OCCUPANT SENSOR SYSTEM

CROSS REFERENCE TO RELATED APPLICATION

The present application is based on and claims priority from Japanese Patent Application 2006-296529, filed Oct. 31, 2006, the contents of which are incorporated herein by reference.

BACKGROUND OF THE INVENTION

1. Field of the Invention

The present invention relates to a capacitance type seat occupant sensor system to be installed in a vehicle.

2. Description of the Related Art

JP-Hei-11-271463-A discloses a seat occupant sensor system that includes a capacitance type sensor and an electronic control system. The capacitance type sensor includes a main electrode disposed inside a seat of a vehicle to detect a change in an electric field that is formed between the main electrode and a portion of a vehicle body.

If no occupant sits on the seat, there is nothing but air in the electric field. If there is a member of a child restraint system (CRS) on the seat, the member intervenes in the electric field. If a passenger sits on the seat, a human body intervenes in the electric field. The dielectric constant of the air is about 1, the dielectric constant of the child seat is usually between 2 and 5, and the dielectric constant of the human body is about 50. Therefore, the capacitance of the capacitor formed between the seat and the vehicle body changes as the occupant of the seat changes among air, the child seat or the human body. Thus, the occupant sensing system discriminates the occupant based on the change in the capacitance.

An air bag system operates according to the result of the discrimination. If, for example, there is no occupant on the seat, an air bag is prohibited to operate. On the other hand, the air bag is allowed to inflate if there is an adult person on the seat.

Because the dielectric constant of the water is 80 and close to the dielectric constant of the human body, it is difficult to discriminate the human body without additional sensor if the seat is wetted by water. In order to discriminate the seat occupant from the wet seat, JP-2006-27591-A proposes a capacitance type sensor system that employs an additional sensor to detect a wet condition of a seat.

JP-2006-201129 discloses a capacitance type occupant sensor system that increases the amount of current flowing between a pair of electrodes only when there is an occupant on the seat.

JP-2006-27591 discloses a capacitance type occupant sensor system that includes a guard electrode for detecting an abnormal condition of a capacitor formed between the guard electrode and the main electrode.

Such capacitance type occupant sensor systems detect an occupant by means of voltage of the capacitance or the amount of current flowing between a pair of electrodes of the capacitance. The amount of current is related to a component intervening between the electrodes and resistance of the circuit that forms the capacitance type occupant sensor. In other words, such resistance includes the resistances of the human body, water, air, etc. These resistances are connected in parallel to the capacitance.

Therefore, the detected amount of current includes an amount of current flowing between the pair of electrodes and an amount of current flowing through the human body, water, air etc. Therefore, it is difficult to discriminate an occupant on the seat with high accuracy.

SUMMARY OF THE INVENTION

An object of the invention is to provide a capacitance type occupant sensor system that can discriminate an occupant of a seat with high accuracy.

Another object of the invention is to provide a capacitance type occupant sensor system that can detect malfunction of the system and wet seat.

According to a feature of the invention, a capacitance type seat occupant sensor system includes an AC electric power source, a main electrode disposed at the seat to form an electric field between the main electrode and a vehicle body, a guard electrode disposed between a seat frame and the main electrode, a switch means for establishing a sending circuit to provide at least a seat occupant sensing mode, impedance calculating means for calculating an impedance of the sensing circuit based on the AC voltage and an amount of current flowing through the sensing circuit, RI calculating means for calculating the real part and the imaginary part of the impedance; and judging means for discriminating an occupant on the seat based on at least the imaginary part of the impedance. In the impedance calculating means, when the switch means provides the seat occupant sensing mode, the switch means forms the main wire and the main electrode into the sensing circuit and renders the guard electrode to have the same potential as the main electrode so that the guard electrode can prevent an electric field from forming between the seat frame and the main electrode.

The human body and water can be considered as a parallel circuit of a resistance and a capacitance, which form an impedance including a real part and an imaginary part. It was found by the inventor that a seat occupant and a wet seat can be sensed more accurately by calculating the imaginary part of the impedance.

In the above seat occupant sensor system: the judging means may discriminate the occupant on the seat based on both the real part and the imaginary part; a sub-electrode may be disposed at a side of the main electrode and a sub-wire for connecting the sub-electrode to a ground so that the impedance calculating means may detect an amount of current flowing from the main electrode to the sub-electrode to calculate an impedance relating to a wet seat wetted by water; the switch means may connect the guard electrode with a ground (vehicle body) to form an electric field between the main electrode and the guard electrode to calculate an impedance relating to a malfunction of the sensor system.

According to another feature of the invention, a capacitance type seat occupant sensor system includes an AC electric power source, a main electrode disposed at a seat to form an electric field between the main electrode and a vehicle body, a sub-electrode disposed at a side of the main electrode, switch means for providing a wet seat sensing mode, impedance calculating means for calculating an impedance between the main electrode and the sub-electrode when the switch means provides the wet seat sensing mode, RI calculating means for calculating the real part and the imaginary part of the impedance and judging means for discriminating a wet seat based on at least the imaginary part of the impedance.

According to another feature of the invention, a capacitance type seat occupant sensor system includes an AC electric power source, a main electrode disposed at the seat to form an electric field between the main electrode and the vehicle body, a guard electrode disposed between the seat frame and the main electrode, a switch means for switching connection of the guard electrode from the electric power source to provide a seat occupant sensing mode to connection of the guard electrode with the vehicle body to provide a malfunction sensing mode, impedance calculating means for calculating an impedance of an electric circuit including the main wire, the main electrode and the guard wire when the switch means provides the malfunction sensing mode, RI calculating means for calculating the real part and the imaginary part of the impedance and judging means for judging a malfunction based on at least one of the real part of the first impedance and the imaginary part of the first impedance.

According to another feature of the invention, a capacitance type seat occupant sensor system includes an AC electric power source, a main electrode disposed at a seat to form an electric field between the main electrode and a vehicle body, a sub-electrode disposed at a side of the main electrode, a guard electrode disposed between the seat frame and the main electrode to confront the main electrode at a distance, a switch means for providing a seat occupant sensing mode, a wet-seat sensing mode and a malfunction sensing mode, the switching mode establishing connection of the guard electrode to have the same potential to provide the seat occupant sensing mode, connecting the sub-electrode with the vehicle body to form an electric field between the main electrode and the sub-electrode to provide the wet seat sensing mode and connecting the guard electrode with the vehicle body to form an electric field between the main electrode and the guard electrode to provide the malfunction sensing mode, impedance calculating means for calculating a first impedance of an electric circuit including the main electrode when the switch means provides the seat occupant sensing mode, a second impedance of an electric circuit including the main electrode and the sub-electrode when the switch means provides the wet seat sensing mode and a third impedance of an electric circuit including the main electrode and the guard electrode, RI calculating means for calculating the real part and the imaginary part of one of the impedances and judging means for judging a seat occupant, a wet seat and a malfunction based on at least one of the real part of the first, second and third impedances and the imaginary part thereof.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A capacitance type seat occupant sensor system 1 according to a preferred embodiment of the invention will be described with reference to the appended drawings.

Figure 1:
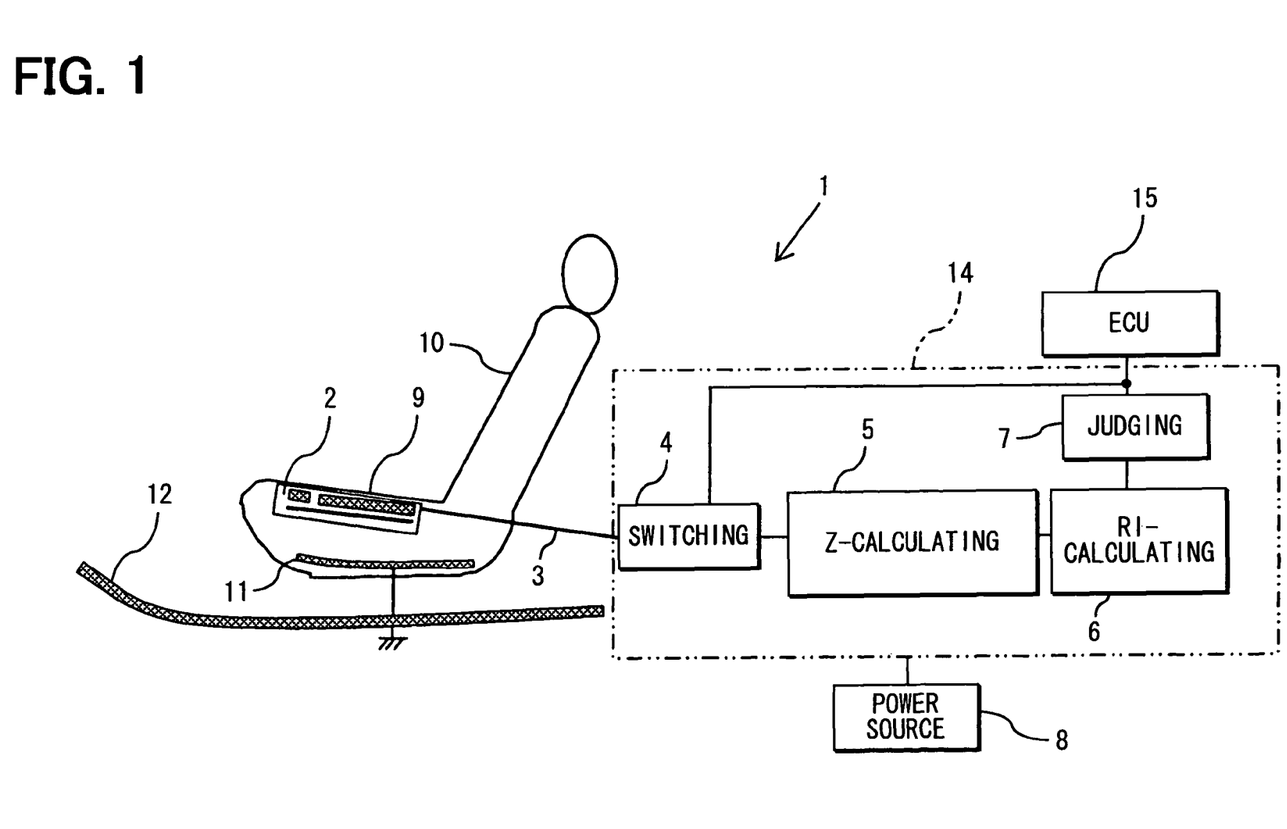
FIG. 1 is a schematic diagram illustrating a capacitance type seat occupant sensor system according to a preferred embodiment of the invention.

As shown in FIG. 1, the capacitance type seat occupant sensor system 1 includes a sensor unit 2, a connector 3, an electric power source 8, an impedance detecting unit 14 and an occupant sensing ECU 15. The sensor unit 2 is disposed in a seat of a vehicle.

The seat has a seat portion 9, a seat back 10 and a seat frame 11. The sensor unit 2 is disposed inside the seat portion 9, and the seat frame 11 is disposed at the bottom of the seat portion 9 to confront the sensor unit 2 at a certain distance. The seat frame 11 is electrically connected to a vehicle body 12.

Figure 2:
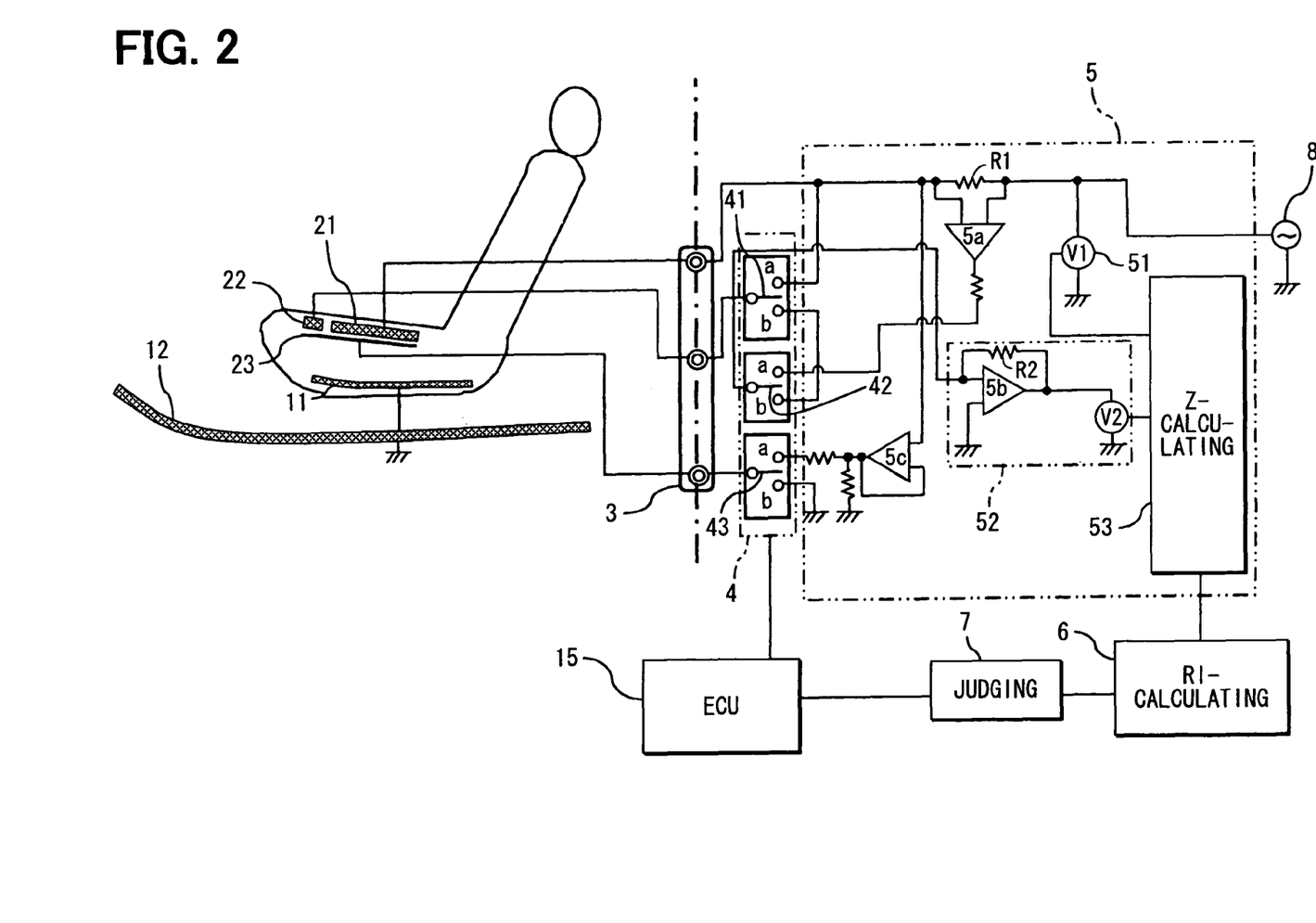
FIG. 2 is a schematic diagram illustrating the capacitance type seat occupant sensor system shown in FIG. 1 in more detail.
Figure 5A:
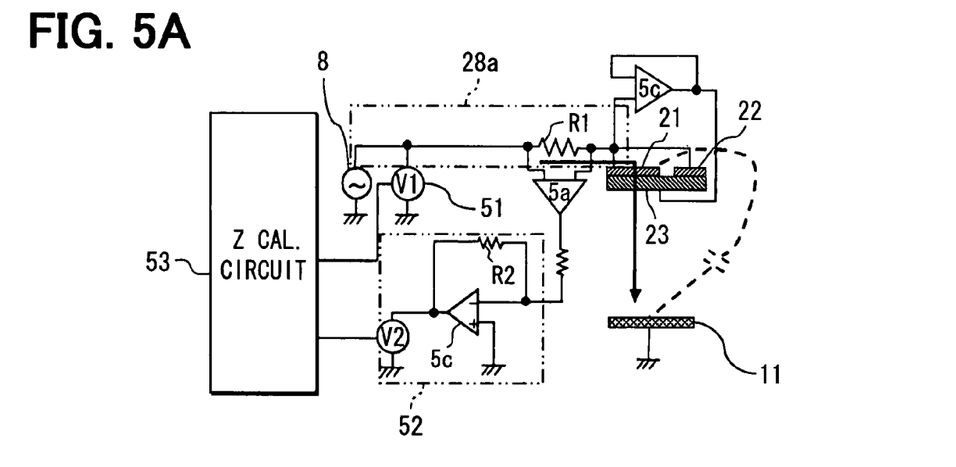
FIGS. 5A, 5B and 5C illustrate a circuit diagram of the capacitance type occupant sensor system that operates in different detection modes.
Figure 5B:
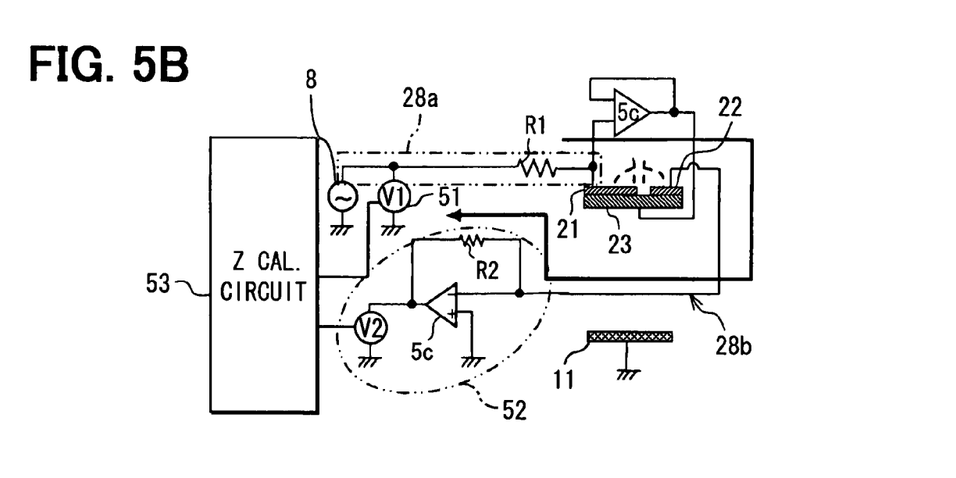
Figure 5C:
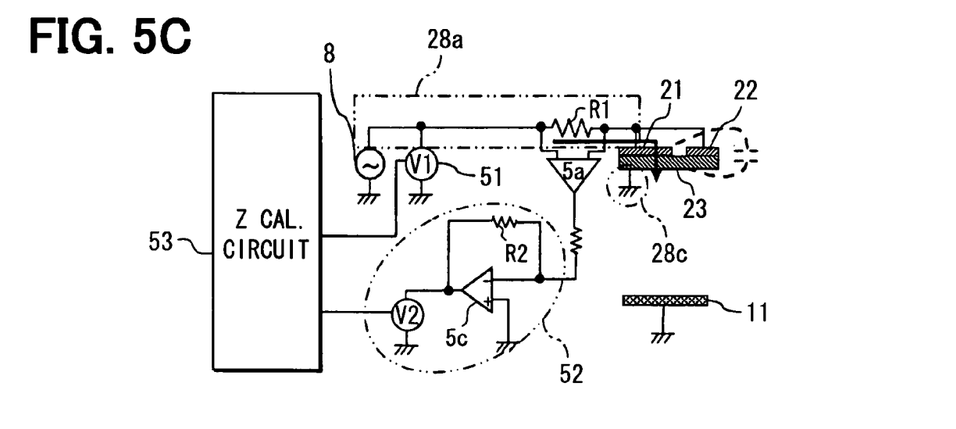

As shown in FIG. 2, the sensor unit 2 includes a main electrode 21, a sub-electrode 22 and a guard electrode 23. The main electrode 21 and the sub-electrode 22 are disposed side by side at a certain distance. The guard electrode 23 is disposed between main electrode 21 and the seat frame 11 to confront the main electrode 21. The connector 3 connects the sensor unit 2 with the impedance detecting unit 14. The connector 3 is usually disposed at the back of the seat. However, a portion of the connector can be inserted into the inside of the seat. The electric power source 8 applies AC voltage to the main electrode 21 via a main wire 28a (as shown in FIG. 5).

The impedance detecting unit 14 includes a switch section 4, an impedance calculating section 5, an real-part-and-imaginary-part calculating section (hereinafter referred to as RI calculating section) 6 and a judging section 7. The switch section 4 includes three analog switches, i.e. a first switch 41, a second switch 42 and a third switch 43, which are controlled by the occupant sensing ECU 15 that is connected to the impedance detecting unit 14. The first switch 41 has a terminal on one side connected with the sub-electrode 22 and two terminals a, b on the other side. The second switch 42 has a terminal on one side connected with a current detecting circuit 52 of the impedance calculating section 5 and two terminals a, b on the other side. The third switch 43 has one terminal on one side connected with the guard electrode 23 and two terminals a, b on the other side. The first, second and third switches 41, 42, 43 respectively connect the one terminals on one side with one of the two terminals a, b on the other side according to a sensing mode, which will be described later.

The impedance calculating section 5 includes a voltage detecting circuit 51, a first resistor R1 that is connected between the electric power source 8 and the b terminal of the first switch 41, a first operational amplifier 5a, the input terminals of which are connected across the first resistor R1 and an output terminal of which is connected with the terminal a of the second switch 42, the current detecting circuit 52 and a third operational amplifier 5c, the input terminal of which is connected with one end of the first resistor R1 and the output terminal of which is connected with the terminal a of the third switch 43, and an impedance calculating circuit 53. The current detecting circuit 52 includes the second operational amplifier 5b and a second resistor R2. The voltage detecting circuit 51 and the current detecting circuit 52 are respectively grounded (or electrically connected with the vehicle body). The first switch 41 and the second switch 42 are connected with each other via the terminals b thereof. The terminal b of the third switch 43 is also grounded.

The impedance calculating circuit 53 is connected with the voltage detecting circuit 51 and the current detecting circuit 52 on one side and with the RI calculating section 6 on the other side. The impedance calculating circuit 53 calculates an impedance based on the voltage detected by the voltage detecting circuit 51 and an amount of current detected by the current detecting circuit 52.

The RI calculating section 6 is connected with the impedance calculating section on one side and with the occupant sensing ECU 15 on the other side. The judging section 7 discriminates between the seat occupant, wet-seat and malfunction based on the values that are calculated by the RI calculating section 6. The values may be sent to an air bag ECU (not shown) to directly carry out the discriminating operation. Incidentally, the impedance calculating circuit 53, the RI calculating section 6 and the judging section 7 may be formed of circuits or operation programs.

Figure 3:
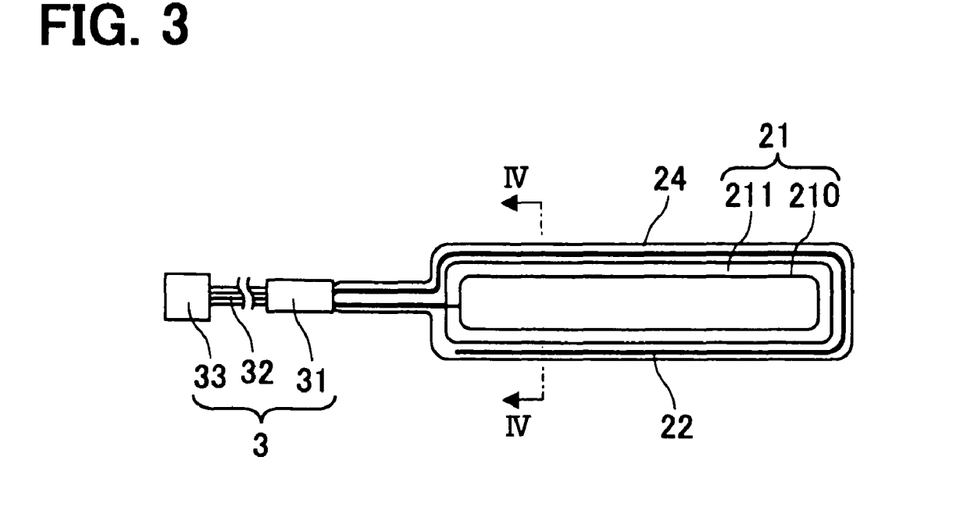
FIG. 3 is a schematic diagram illustrating a sensor and a connector of the seat occupant sensor system.
Figure 4:
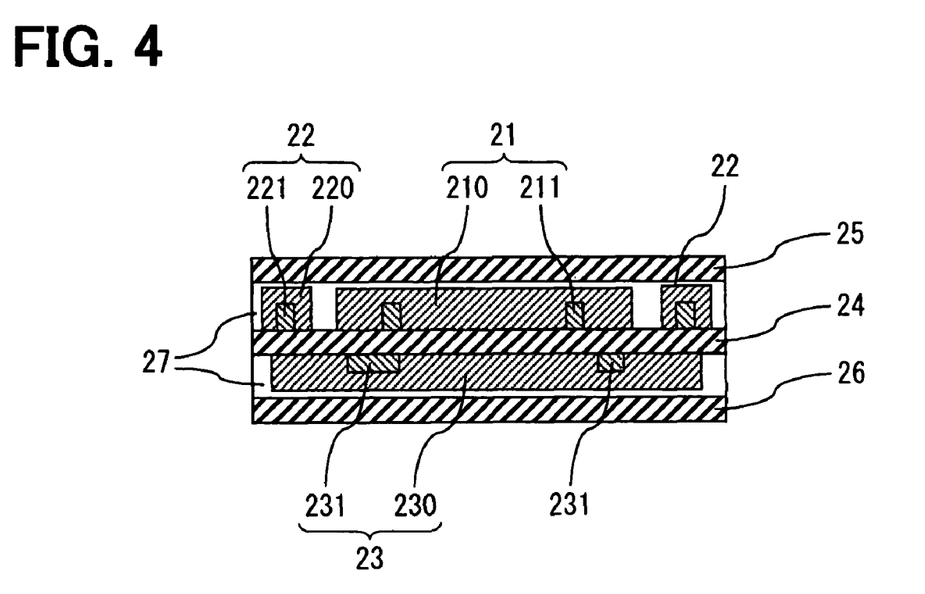
FIG. 4 is a cross-sectional view of the sensor shown in FIG. 3 cut along line IV-IV.

As shown in FIGS. 3 and 4, the sensor unit 2 is a sheet member that includes the main electrode 21, the sub electrode 22, the guard electrode 23, a base film 24, an upper layer film 25 and a lower layer film 26. The connector 3 includes a shield wire connector 31, shield wires 32 and a switch connector 33. The base film 24, the upper layer film 25 and the lower layer film 26 are made of insulating material such as poly-ethylene terephthalate (PET) and bonded to each other by an adhesive 27.

The sub-electrode 22 is constructed of a carbon electrode 220 and a silver electrode 211 and is formed to surround the main electrode 21 at a certain distance. Therefore, the silver electrode 221 is disposed inside the carbon electrode 220 at the middle of the width thereof so as to extend along the carbon electrode. The guard electrode 23 is constructed of a carbon electrode 230 and a silver electrode 231. The guard electrode 23 is disposed between the base film 24 and the lower layer film 26 to confront the main electrode 21. The carbon electrode 230 has a rectangular surface, while the silver electrode 231 has a shape of a rectangular frame, which is disposed inside the carbon electrode 230. The main electrode 21 and the guard electrode 23 are insulated from each other by the base film 24.

The shield wire connector 31 and the switch connector 33 are disposed at the back of the seat. The main electrode 21, the sub-electrode 22 and the guard electrode 23 is disposed inside the seat and connected with the shield wire connector 31 via through holes (not shown). The shield wire connector 31 is connected with the switch connector 33 via the shield wires 32. The switch connector 33 is connected with the switch section 4 of the impedance detecting unit 14.

The seat occupant sensor system operates in the following three modes: an occupant sensing mode, a wet seat sensing mode and a malfunction sensing mode.

The occupant sensing mode is started when the all the switches 41-43 are switched to connect with the terminals a. As shown in FIG. 5A, the electric power source 8 applies AC voltage to the main electrode 21 to form an electric field between the main electrode 21 and the vehicle body 12. Then the third operational amplifier 5c equalizes the potential of the main electrode 21 with that of the guard electrode 23. The electric power source 8 also applies the AC voltage to the sub-electrode 22 via the first switch 41. The voltage detecting circuit 51 detects the AC voltage.

If there is no occupant on the seat, only air intervenes between the main electrode 21 and the vehicle body 12. If, on the other hand, there is an adult person on the seat, the human body of the adult person intervenes between the main electrode 21 and the vehicle body 12. As shown in FIG. 5A, electric current flows from the electric power source 8 into an occupant sensing circuit that includes the main wire 28a, the main electrode 21 and an electric path formed from the main electrode 21 to the vehicle body 11, as indicated by a broken line. Incidentally, the main wire 28a extends from the electric power source 8 via the first resistor R1 to the main electrode 21. The current detecting circuit 52 detects an amount of the current flowing through the resistor R1.

The impedance calculating circuit 53 calculates a first impedance Z1 of the occupant sensing circuit based on the voltage detected by the voltage detecting circuit 51 and the amount of current detected by the current detecting circuit 52. The first impedance Z1 includes an impedance Za between the main electrode 21 and the vehicle body. A member that intervenes between the main electrode 21 and the vehicle body such as a human body, air or a member of CRS includes not only a capacitive component but a resistive component. In other words, the impedance Za is an impedance of a parallel circuit of a capacitor and a resistor.

The first impedance Z1 is broken down by the RI calculating section 6 into a real part and an imaginary part. That is, $Z1=1/Re+j\cdot 1/Im$, wherein Re is a real part and Im is an imaginary part. When the resistive component is defined by R, when the capacitive component is defined by C, and when the angular frequency is defined by $\omega$, $1/Z1=Re(1/Z1)+Im(1/Z1)\cdot j=1/R+C\omega\cdot j$.

Figure 6:
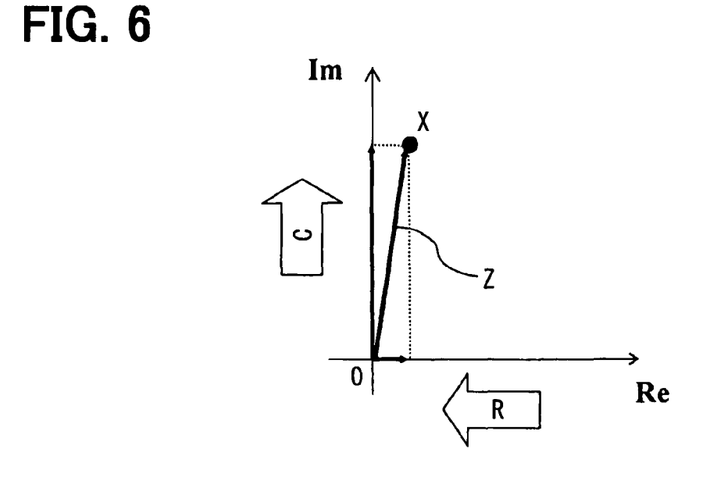
FIG. 6 is a graph showing resistance and capacitance components of an impedance.

As shown in FIG. 6, if the resistive component becomes larger, the real part Re becomes smaller, and the imaginary part Im becomes larger if the capacitive component becomes larger. The length of the vector from point 0 to point X indicates a value of the impedance Z. In the seat occupant sensing mode, the judging section 7 discriminates a seat occupant based on the real and the imaginary parts of the first impedance that are calculated by the RI calculating section 6.

Figure 7:
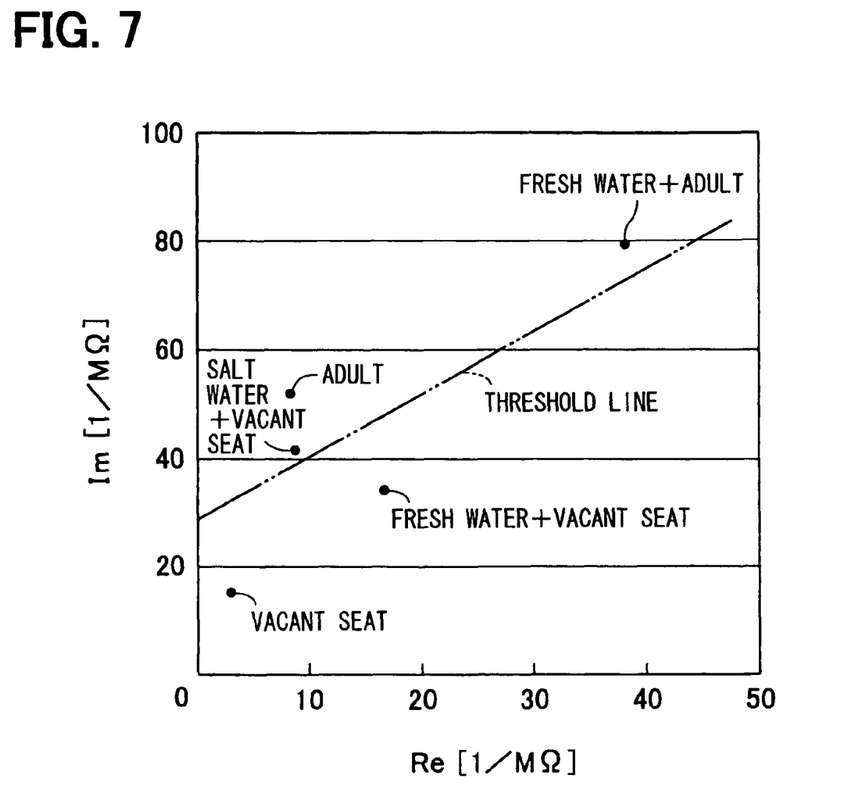
FIG. 7 is a graph showing various impedances of the seat occupant calculated in an occupant detection mode.

As shown in FIG. 7, when there is an adult person on the seat, the real and imaginary parts of the first impedance Z1 become larger than those when there is no occupant on the seat. That is, if there is an adult occupant, the real and imaginary parts are plotted above a two-dot-chain line, which is hereafter referred to as the threshold line, and they are plotted below the threshold line except for the vacant seat that is wetted by salt water.

When there is no occupant on the seat, the guard electrode 23 forms an electric field with the seat frame 11. Because the guard electrode 23 has the same potential level as the main electrode 21, the capacitance formed between the main electrode 21 and the seat frame 11 is almost canceled or becomes much smaller, as described in JP-2006-201129-A.

The wet seat sensing mode will be described with reference to FIGS. 5B, 8 and 9.

The wet seat sensing mode is started when the first and second switches 41, 42 are switched to connect with the terminals b and the third switch 43 is switched to connect with the terminal a. As shown in FIG. 5B, the sub-electrode 22 is connected with the current detecting circuit 52, so that an electric field is formed between the main electrode 21 and the sub-electrode 22. The impedance Zb between the main electrode 21 and the sub-electrode 22 is an impedance of a parallel circuit of a capacitor and a resistor. The capacitance of the capacitor and the resistance of the resistor change if fresh water or salt water intervenes between the main electrode 21 and the sub-electrode. This change is detected by the current detecting circuit 52. An arrow in FIG. 5B indicates one direction (normal direction) of the AC current. In other words, the current flows from the electric power source 8 to the ground (vehicle body) via the main wire 28a which includes the second resistor R2, the main electrode 21, the sub-electrode 22 and a sub-wire 28b. The amount of the current flowing through the second resistor R2 is detected by the current detecting circuit 52. Incidentally, the sub-wire 28b extends from the sub-electrode 22 to the ground (vehicle body).

In the wet seat sensing mode, the impedance calculating circuit 53 calculates the second impedance Z2 based on the voltage detected by the voltage detecting circuit 51 and the amount of current detected by the current detecting circuit 52.

The RI calculating section 6 calculates the real part of the second impedance Z2 and the imaginary part of the same in the same manner as the seat occupant sensing mode. The judging section 7 discriminates a wet seat based on the real and imaginary parts of the second impedance Z2 and malfunction of the wet seat sensing circuit (hereinafter referred to as the first malfunction) based on the imaginary part.

Figure 8:
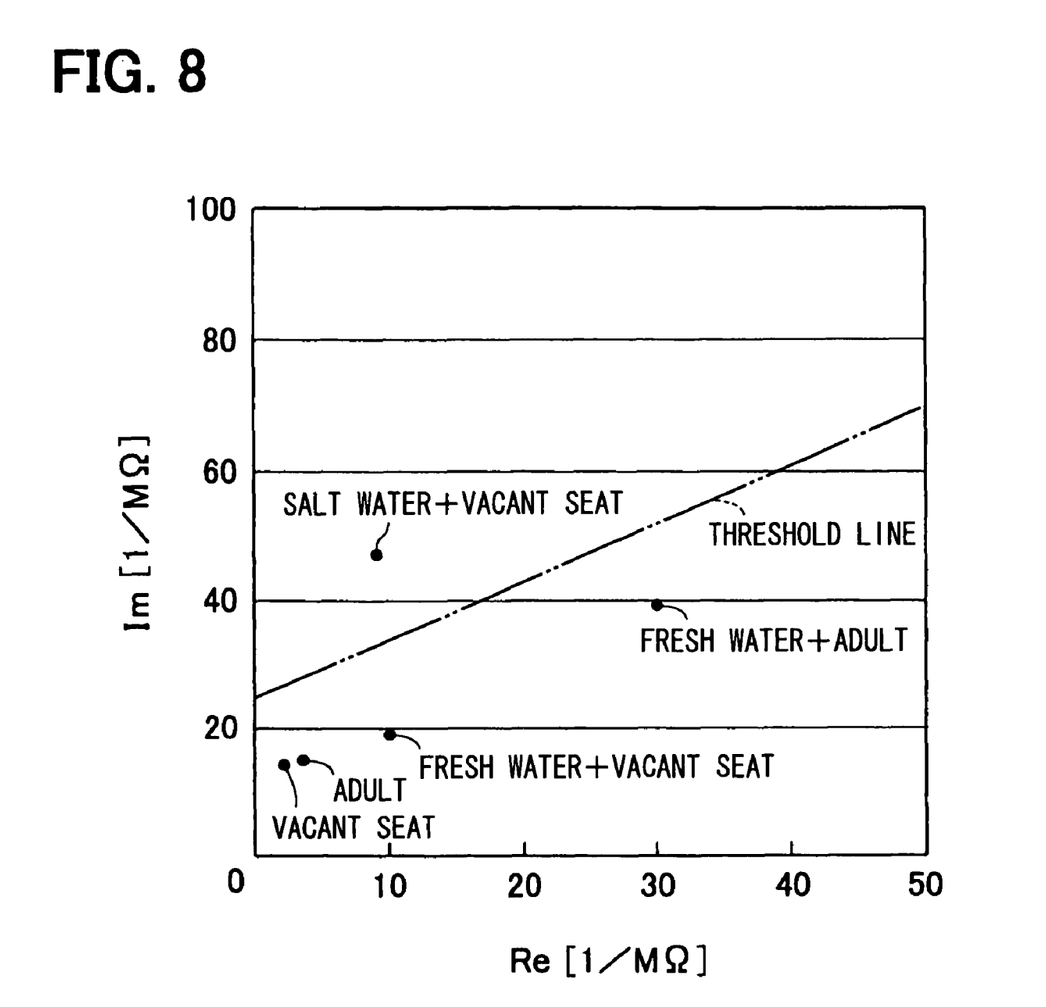
FIG. 8 is a graph showing various impedances of the seat occupant calculated in a wet seat sensing mode.

If the seat is wetted by salt water, the real and imaginary parts of the second impedance Z2 become larger than a two-dot-chain line or threshold line, as shown in FIG. 8. On the other hand, the real and imaginary parts of the second impedance Z2 become smaller than the threshold line in the following cases: (1) there is no occupant on the seat; (2) there is an adult person on the seat; and (3) there is an adult person on the seat that is wetted by fresh water.

The judging section 7 discriminates the seat wetted by salt water based on the values of the real and imaginary parts. Incidentally, the judging section 7 can also discriminate the seat wetted by fresh water if the threshold line is appropriately set.

The malfunction of the wet seat sensing circuit in the wet seat sensing mode will be described with reference to FIG. 9. The wet seat sensing circuit is formed from the main electrode 21, the sub-electrode 22 and the sub-wire 28b.

Figure 9:
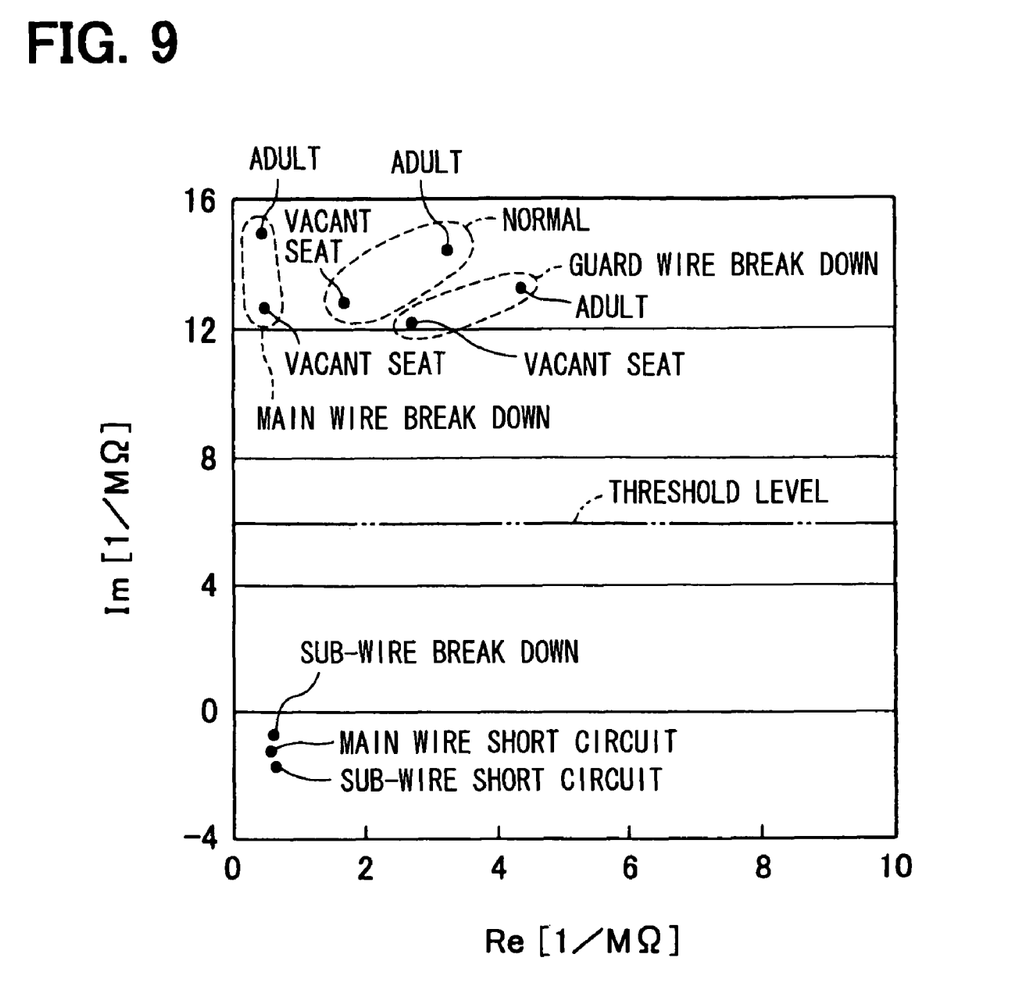
FIG. 9 is a graph showing various impedances caused by malfunctions in the wet seat sensing mode.

When the wet seat sensing circuit is normal, the real part Re of the second impedance Z2 is about 2 [1/MΩ] and the imaginary part Im is about 14 [1/MΩ], as shown in FIG. 9. If the main electrode 21 or the sub-electrode 22 establishes a short circuit or if the sub-wire 28b breaks down, the real part Re and the imaginary part Im become approximately 0. Here, the threshold level of the discrimination is set as follows:

$$Im=6 [1/MΩ]$$

When the wet seat sensing circuit is normal, the imaginary part Im of the second impedance is located above the threshold level.

If the main electrode 21 or the sub-electrode 22 establishes a short circuit or if the sub-wire 28b breaks down, the imaginary part Im of the second impedance is located below the threshold level. Thus, short circuiting of the main electrode 21 and the sub-electrode and break down of the sub-wire 28b can be detected easily.

The malfunction sensing mode is initiated when the first and second switches 41, 42 are switched to connect with the terminals a and the third switch 43 is switched to connect with the terminal b. As shown in FIG. 5C the guard electrode 23 is grounded. Then, the electric source 8 applies AC voltage to the main electrode 21 to form an electric field between the main electrode 21 and the guard electrode 23. The impedance Zc between the main electrode 21 and the guard electrode 23 is an impedance of a parallel circuit of a capacitor and a resistor.

An arrow in FIG. 5C indicates a normal direction of the AC current. In other words, the current flows in a malfunction sensing circuit that includes the electric path from the electric power source 8 to the ground (vehicle body) via the main wire 28a, the main electrode 21, the guard electrode 23 and a guard wire 28c. The amount of current is also detected by the current detecting circuit 52.

Therefore, the impedance calculating circuit 53 calculates the third impedance Z3, which includes the impedance Zc, based on the voltage detected by the voltage detecting circuit 51 and the amount of current detected by the current detecting circuit 52. Incidentally, even if current does not flow through the abnormal current sensing circuit, such malfunction can be detected because the amount of current flowing through the resistor R2 also changes from the amount of the normal current.

The RI calculating section 6 calculates the real part of the second impedance Z3 and the imaginary part of the same in the same manner as the seat occupant sensing mode. The judging section 7 judges malfunction (hereinafter referred to as the second malfunction), such as a break down of the main wire 28a or the guard wire 28c, based on the real and imaginary parts of the third impedance Z3.

Figure 10:
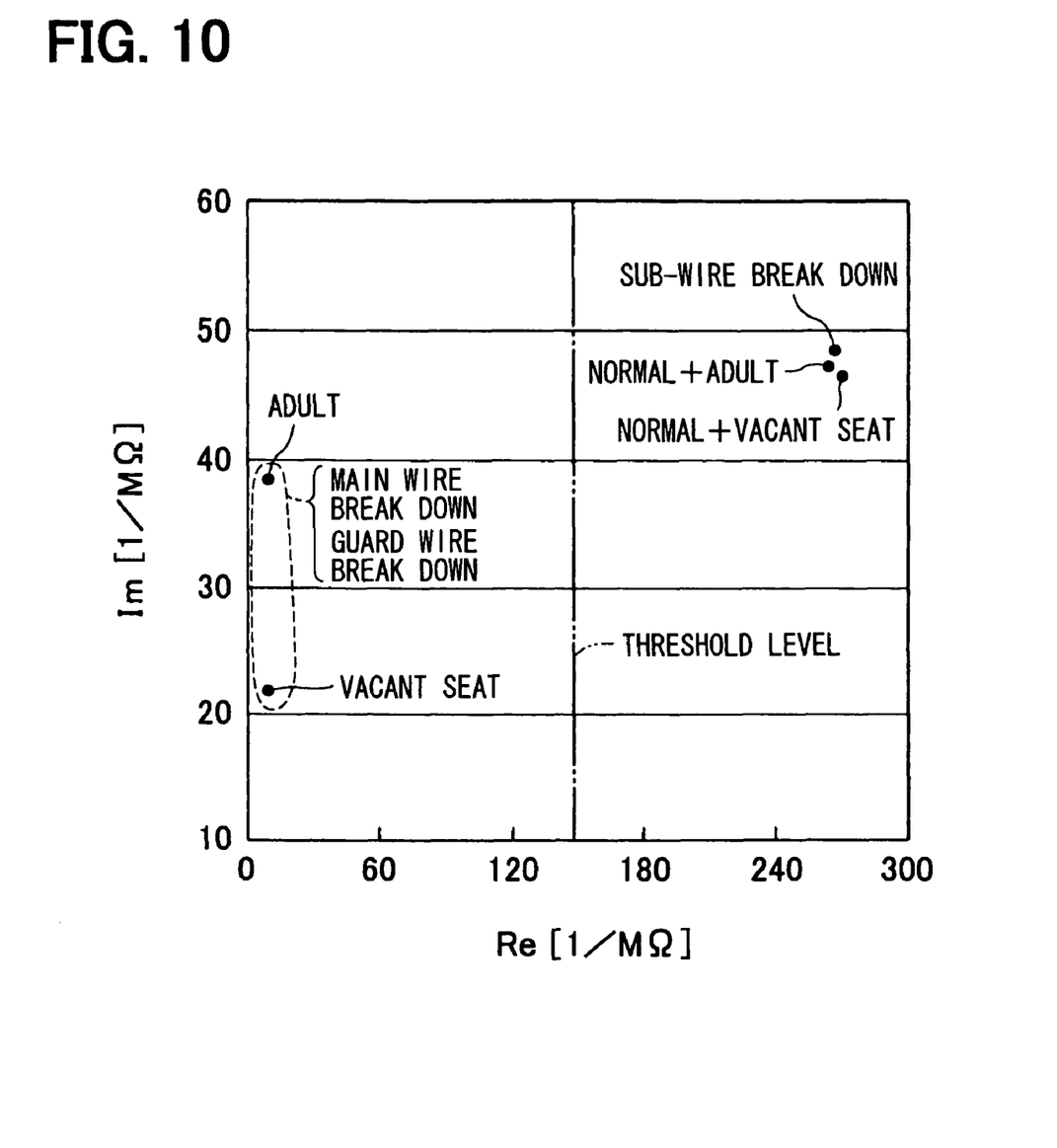
FIG. 10 is a graph showing various impedances caused by malfunctions in the malfunction detection mode.

When the malfunction sensing circuit is normal, the real part Re of the second impedance Z3 is about 280 [1/MΩ] and the imaginary part Im is about 45 [1/MΩ], as shown in FIG. 10. If the main wire 28a or the guard wire 28c breaks down, the real part Re becomes approximately 0 and the imaginary part Im falls in a range between 22 [1/MΩ] and 38 [1/MΩ]. Here, the threshold level of the discrimination is set as follows:

$$Re=150 [1/MΩ]$$

Therefore, when the malfunction sensing circuit is normal, the imaginary part Im of the second impedance is located on the right of the threshold level.

If the main wire 28a or the guard wire 28c breaks down, the real part Re of the third impedance Z3 is located on the left of the threshold level. Therefore, the judging section 7 can judge a malfunction except for the break down of the sub-wire 28b by comparing the real part Re of the third impedance with the threshold level.

In case of the break down of the sub-wire 28b, where the real part of the third impedance Re is located on the right of the threshold level, it is possible to detect the break down in the wet-seat sensing mode, as described above.

The operation of the capacitance type seat occupant sensor system will be described next, with reference to FIGS. 11-13.

Figure 11:
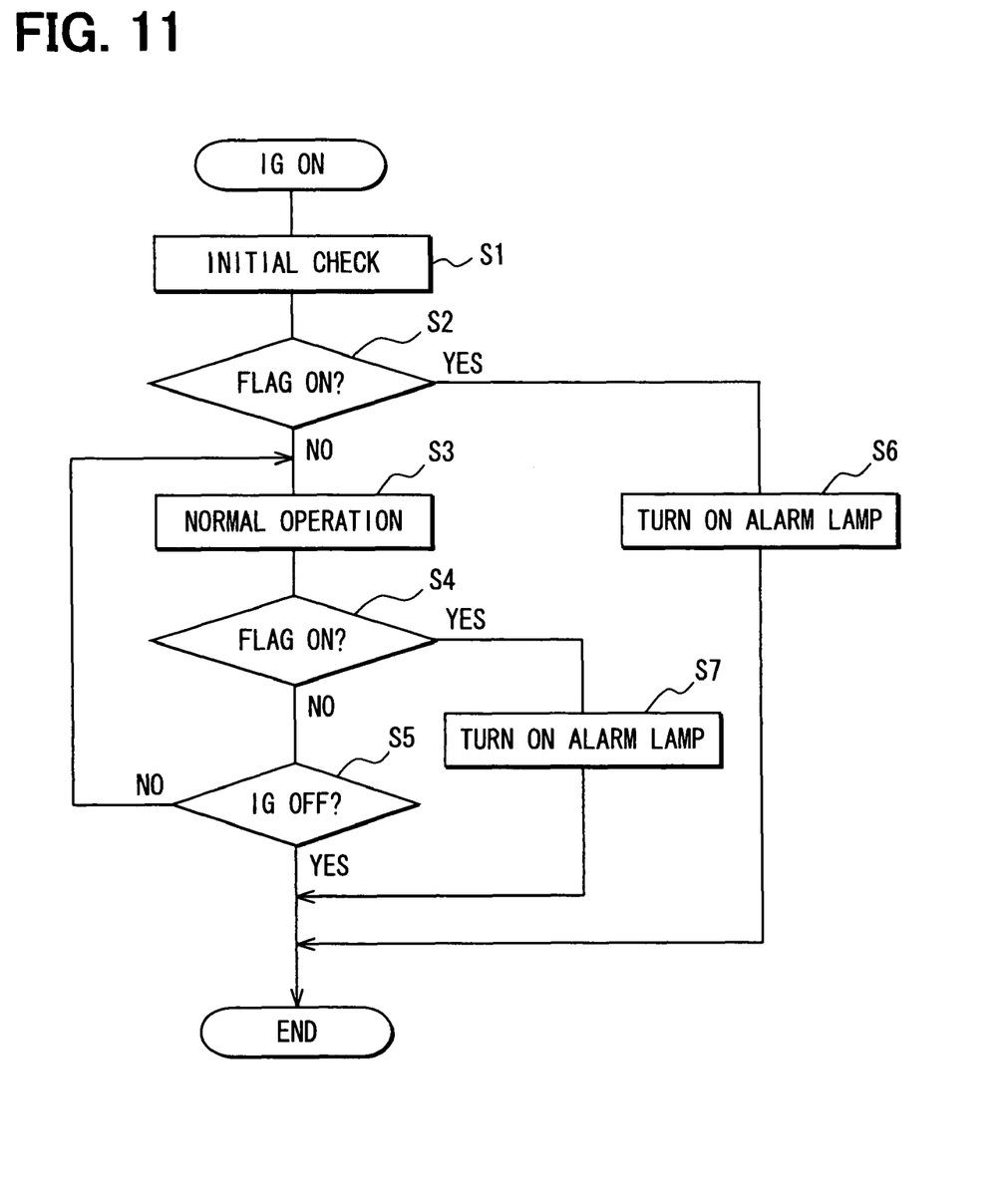
FIG. 11 is a flow diagram of a main operation.

The capacitance type seat occupant sensor system starts its operation when an ignition switch of a car is turned on, as shown in FIG. 11. Firstly, an initial checking is carried out at step S1.

Figure 12:
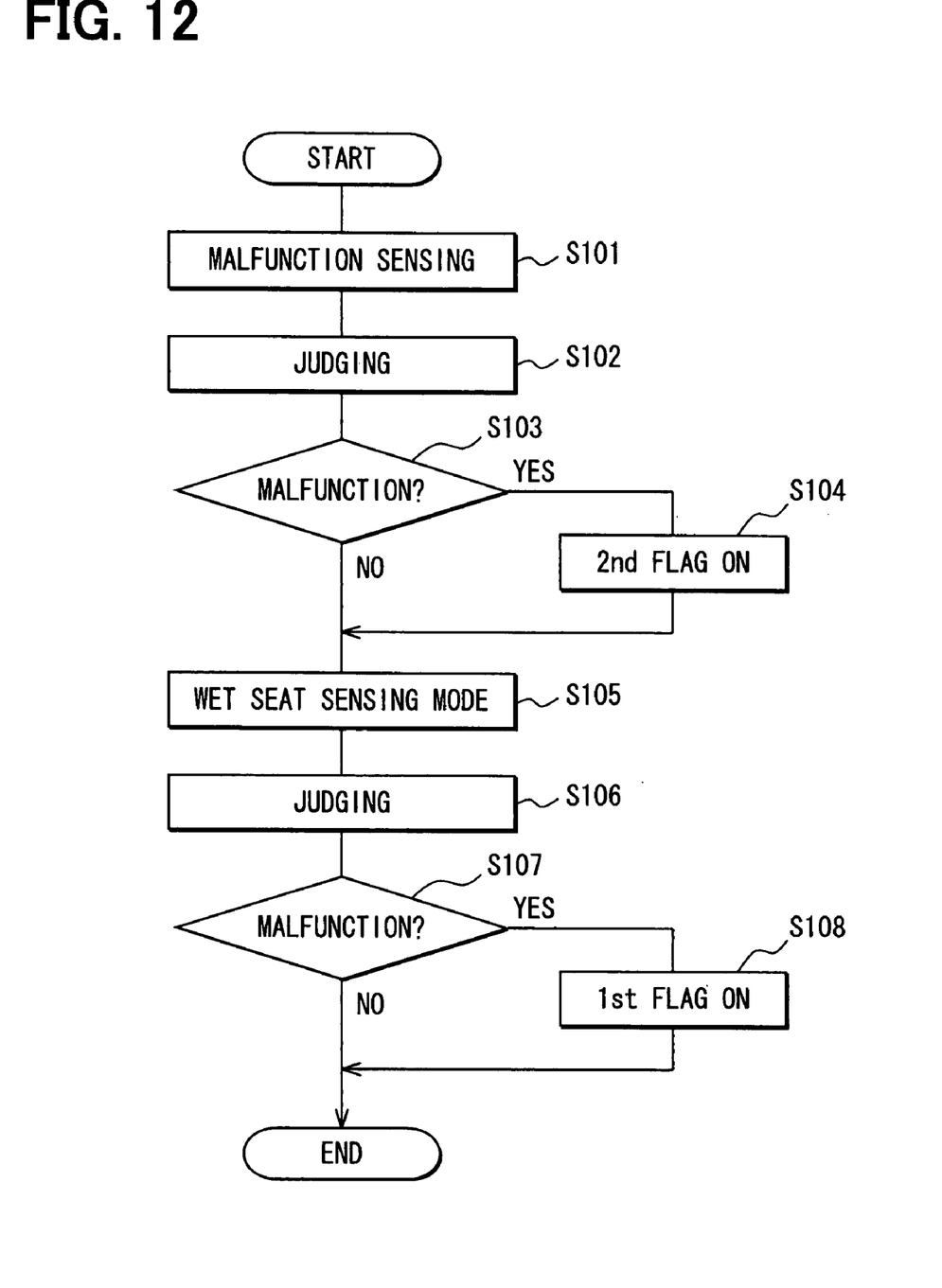
FIG. 12 is a flow diagram of an initial check.
Figure 13:
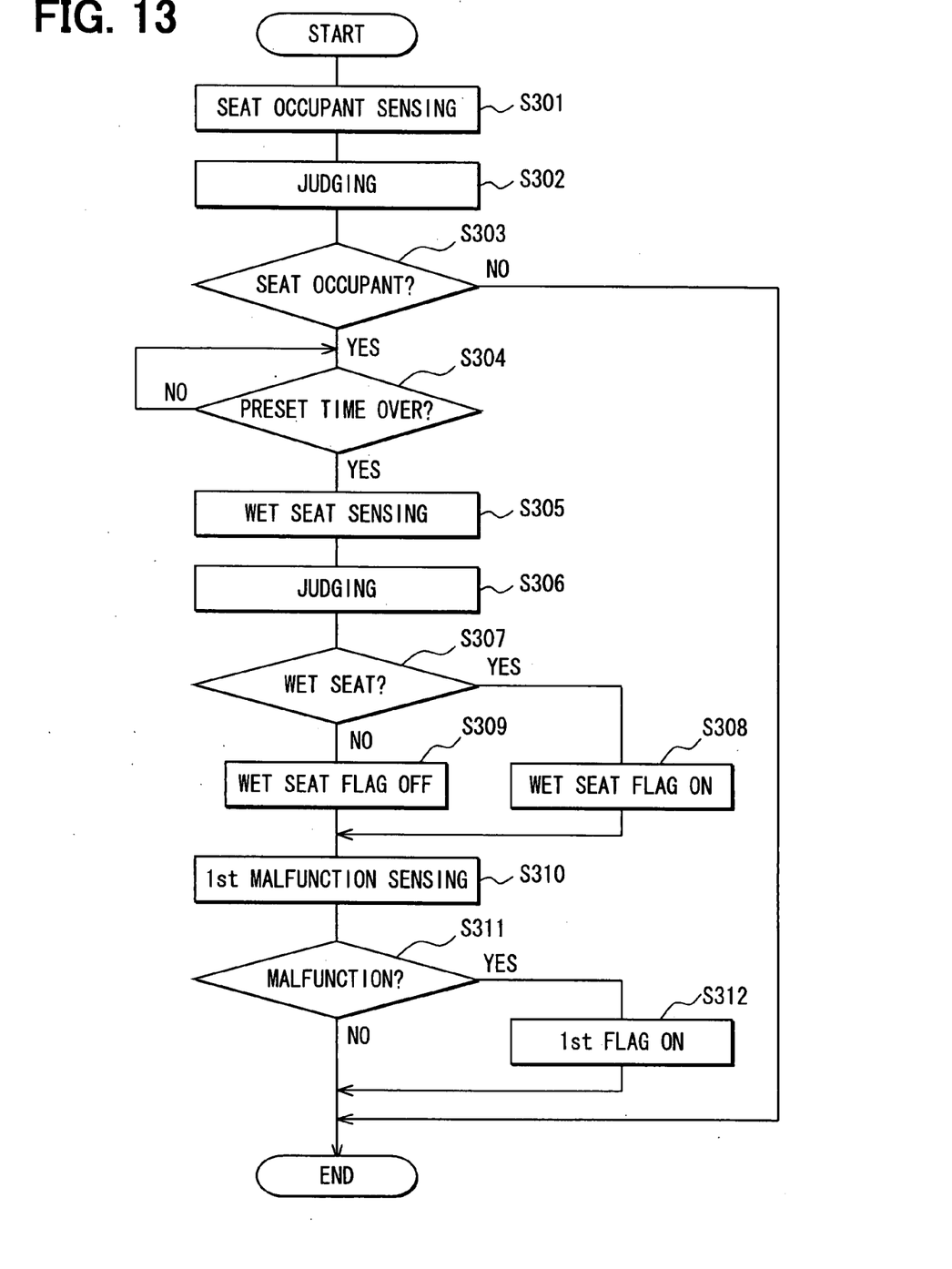
FIG. 13 is a flow diagram of a normal operation.

When the initial checking is started, the switch section 4 switches to the malfunction mode at S101, as shown in FIG. 12. Then, the judgment of the second malfunction is carried out at S102. If it is judged that there is the second malfunction (YES) at S103, a second malfunction flag is turned on at S104, and the switch section 4 switches to the wet seat sensing mode at S105. On the other hand, the step S105 immediately follows if it is judged that there is no second malfunction at S103.

In the wet seat sensing mode, the judgment of the first malfunction is carried out at S106. If it is judged that there is the first malfunction (YES) at S107, a first malfunction flag is turned on at S108, and the initial checking S1 ends. On the other hand, the ending of the initial checking S1 immediately follows if it is judged that there is no first malfunction at S107.

Thereafter, if the first malfunction flag or the second malfunction flag is turned on or not is examined at step S2. If the result is YES, the occupant sensing ECU 15 turns on an alarm lamp at S6 and stops the operation of the seat occupant sensor system. If the result of the step S2 is NO, the occupant sensing ECU 15 starts the normal operation of the seat occupant sensor system at S3.

The normal operation will be described with reference to a flow diagram shown in FIG. 13. In the normal operation, the switch section 4 switches to the seat occupant sensing mode at S301. Thereafter, seat occupant sensing is carried out at S302, where whether there is an occupant on the seat is examined. If no occupant on the seat is sensed at S303, No is outputted to end the normal operation.

On the other hand, a signal of YES is transmitted by the occupant sensing ECU 15 to an air bag ECU to, for example, allow an air bag system to be on alert. That is, the air bag system of a vehicle automatically inflates an airbag when the vehicle comes into collision with an object or another vehicle.

Thereafter, if a preset time has passed or not is examined at S304. If the result of S304 is YES, the switch section 4 switches the seat occupant sensing mode to the wet seat sensing mode at S305 to carry out wet seat sensing. If the seat is wetted by water, YES is outputted at S307 to turn on a wet seat flag at S308.

On the other hand, No is outputted at S307 to turn off the wet seat flag at S309 if the seat is not wetted.

After the steps S308 and S309, first malfunction detection is carried out at S310, and whether there is a first malfunction or not is examined at S311. If the result of S311 is YES, the second malfunction flag is turned on at S312 and the normal operation ends. On the other hand, the normal operation immediately ends if the result of S311 is NO.

After the normal operation starts at step S3, whether the first malfunction flag is turned on or not is examined at S4. If the result of the step S4 is NO, whether the ignition switch is turned off or not is examined at S5. If the result of the step S4 is YES, the occupant sensing ECU 15 turns on the alarm lamp at S7 before the end of the operation of the seat occupant sensor system. On the other hand, the normal operation repeats if the result of the step S5 is NO. The operation of the seat occupant sensor system 1 ends if the result of S5 is YES.

In the above embodiment, it is possible to detect the second malfunction based on both the real part and the imaginary part of the third an impedance.

Because the resistances of the main wire 28a, the sub-wire 28b and the guard wire 28c are negligibly small, the first impedance is approximately equal to the impedance between the main electrode 21 and the body 12, the second impedance is approximately equal to the impedance between the main electrode 21 and the sub-electrode 22, and the third impedance is approximately equal to the impedance between the main electrode 21 and guard electrode 23.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A capacitance type seat occupant sensor system of a vehicle having a vehicle body, a seat frame that is fixed to and electrically connected with the vehicle body and a seat fixed to the seat frame, the system comprising:
   an electric power source for providing AC voltage;
   a main electrode disposed at the seat to form an electric field between the main electrode and the vehicle body;
   a main wire connecting the electric power source and the main electrode;
   a guard electrode disposed between the seat frame and the main electrode;
   means for establishing a sensing circuit to provide at least a seat occupant sensing mode;
   means for calculating an impedance of the sensing circuit based on the AC voltage and an amount of current flowing through the sensing circuit;
   means for calculating the real part and the imaginary part of the impedance; and
   means for judging an occupant on the seat based on at least the imaginary part of the impedance, wherein:
   when the establishing means provides the seat occupant sensing mode, the establishing means forms the main wire and the main electrode into the sensing circuit and renders the guard electrode to have the same potential as the main electrode;
   the judging means judges that there is an occupant according to a position indicated by the real part and the imaginary part of the first impedance in a rectangular coordinate having one axis of the real value and the other axis of the imaginary value compared to a preset position in the rectangular coordinate;
   the judging means judges that there is an occupant by comparing the position indicated by the real part and the imaginary part with a threshold line in the rectangular coordinate;
   assuming that the first impedance is Z1, the real part of the first impedance is Re, and the imaginary part of the first impedance is Im, when the resistive component is defined by R, when the capacitive component is defined by C, and when the angular frequency is defined by $\omega$, $1/Z1 = Re(1/Z1) + Im(1/Z1) \cdot j = 1/R + C\omega \cdot j$;
   the real part is an inverse number of a resistive component of the first impedance and the imaginary part is a capacitive component of the first impedance; and
   the threshold line is a linear function of the real part and the imaginary part.

2. A seat occupant sensor system as in claim 1 further comprising a sub-electrode disposed at a side of the main electrode and a sub-wire for connecting the sub-electrode to the vehicle body, wherein:
   when the establishing means provides a wet-seat sensing mode, the establishing means forms the main electrode and the sub-electrode into the sensing circuit; and
   the judging means judges whether the seat is wetted by water or not by comparing the imaginary part of the impedance with a threshold level.

3. A seat occupant sensor system as in claim 2, wherein the judging means judges whether the seat is wetted by water or not by further comparing the real part of the impedance with a threshold level.

4. A seat occupant sensor system as in claim 2, wherein the judging means judges whether there is a malfunction in one of the main electrode, the main wire, the sub-electrode, the sub-wire or not by further comparing the imaginary part of the impedance with a threshold level.

5. A seat occupant sensor system as in claim 4, wherein the judging means judges that there is a malfunction in one of the main electrode, the main wire, the sub-electrode, the sub-wire if the imaginary part of the impedance is smaller than the threshold level.

6. A seat occupant sensor system as in claim 5, wherein the malfunction to be judged includes short-circuiting of the main electrode, short-circuiting of the sub-electrode and break down of the sub-wire.

7. A capacitance type seat occupant sensor system of a vehicle having a vehicle body, a seat frame that is fixed to and electrically connected with the vehicle body and a seat fixed to the seat frame, the system comprising:
- an electric power source for providing AC voltage;
- a main electrode disposed at the seat to form an electric field between the main electrode and the vehicle body;
- a main wire connecting the electric power source and the main electrode;
- a guard electrode disposed between the seat frame and the main electrode;
- means for establishing a sensing circuit to provide a seat occupant sensing mode and a malfunction sensing mode;
- means for calculating an impedance of the sensing circuit based on the AC voltage and an amount of current flowing through the sensing circuit;
- means for calculating the real part and the imaginary part of the impedance;
- means for judging an occupant on the seat based on at least the imaginary part of the impedance, and
- a guard wire connecting the guard electrode with the vehicle body, wherein:
- when the establishing means provides the seat occupant sensing mode, the establishing means forms the main wire and the main electrode into the sensing circuit and renders the guard electrode to have the same potential as the main electrode, and
- when the establishing means provides the malfunction sensing mode, the establishing means forms the main electrode, the guard electrode and the guard wire into the sensing circuit;
- the judging means judges whether there is a malfunction or not in the sensing circuit by comparing a position of the real part of the impedance and the imaginary part thereof in a rectangular coordinate having one axis of the real value and the other axis of the imaginary value compared with a threshold level in the rectangular coordinate;
- the judging means judges that there is an occupant by comparing the position indicated by the real part and the imaginary part with a threshold line in the rectangular coordinate;
- assuming that the first impedance is Z1, the real part of the first impedance is Re, and the imaginary part of the first impedance is Im, when the resistive component is defined by R, when the capacitive component is defined by C, and when the angular frequency is defined by $\omega$, $1/Z1=Re(1/Z1)+Im(1/Z1)\cdot j=1/R+C\omega\cdot j$;
- the real part is an inverse number of a resistive component of the first impedance and the imaginary part is a capacitive component of the first impedance; and
- the threshold line is a linear function of the real part and the imaginary part.

8. A seat occupant sensor system as in claim 7, wherein the judging means judges that there is a malfunction in one of the main electrode, the main wire, the guard electrode, the guard wire if the real part of the impedance is smaller than the threshold level.

9. A seat occupant sensor system as in claim 8, wherein the malfunction to be judged includes break down of the main wire and break down of the guard wire.

10. A capacitance type seat occupant sensor system of a vehicle having a vehicle body, a seat frame that is fixed to and electrically connected with the vehicle body and a seat fixed to the seat frame, the system comprising:
- an electric power source for providing AC voltage;
- a main electrode disposed at the seat to form an electric field between the main electrode and the vehicle body;
- a main wire connecting the electric power source and the main electrode;
- a sub-electrode disposed at a side of the main electrode;
- a sub-wire connected with a ground;
- means for connecting the sub-electrode with the sub-wire to form an electric field between the main electrode and the sub-electrode, thereby providing a wet seat sensing mode;
- means for calculating an impedance between the main electrode and the sub-electrode when the connecting means provides the wet seat sensing mode;
- means for calculating the real part and the imaginary part of the impedance; and
- means for judging a wet seat based on at least the imaginary part of the impedance; wherein
- the judging means judges that there is a wet seat according to a position indicated by the real part and the imaginary part of the impedance in a rectangular coordinate having one axis of the real value and the other axis of the imaginary value compared to a preset threshold line in the rectangular coordinate;
- the judging means judges that there is an occupant by comparing the position indicated by the real part and the imaginary part with a threshold line in the rectangular coordinate;
- assuming that the first impedance is Z1, the real part of the first impedance is Re, and the imaginary part of the first impedance is Im, when the resistive component is defined by R, when the capacitive component is defined by C, and when the angular frequency is defined by $\omega$, $1/Z1=Re(1/Z1)+Im(1/Z1)\cdot j=1/R+C\omega\cdot j$;
- the real part is an inverse number of a resistive component of the first impedance and the imaginary part is a capacitive component of the first impedance; and
- the threshold line is a linear function of the real part and the imaginary part.

11. A capacitance type seat occupant sensor system as in claim 10, wherein the judging means discriminates the wet seat based on both the real part and the imaginary part.

12. A seat occupant sensor system as in claim 11, wherein the judging means judges whether there is a malfunction in one of the main electrode, the main wire, the sub-electrode and the sub-wire or not by further comparing the imaginary part of the impedance with a threshold level.

13. A seat occupant sensor system as in claim 11, wherein the judging means judges that there is a malfunction in one of the main electrode, the main wire, the sub-electrode and the sub-wire if the imaginary part of the impedance is smaller than the threshold level.

14. A seat occupant sensor system as in claim 13, wherein the malfunction to be judged includes short-circuiting of the main electrode, short-circuiting of the sub-electrode, and break down of the sub-wire.

15. A capacitance type seat occupant sensor system of a vehicle having a vehicle body, a seat frame that is fixed to and electrically connected with the vehicle body and a seat fixed to the seat frame, the system comprising:

an electric power source for providing AC voltage;
a main electrode disposed at the seat to form an electric field between the main electrode and the vehicle body;
a main wire connecting the electric power source and the main electrode;
a guard electrode disposed between the seat frame and the main electrode;
a guard wire electrically connected with the vehicle body;
means for switching connection of the guard electrode from the electric power source to provide a seat occupant sensing mode to connection of the guard electrode with the guard wire to provide a malfunction sensing mode;
means for calculating an impedance of an electric circuit including the main wire, the main electrode and the guard wire when the switch means provides the malfunction sensing mode;
means for calculating the real part and the imaginary part of the impedance (Z3); and
means for judging a malfunction of one of the main wire, the main electrode, the guard wire and the guard electrode based on at least one of the real part of the first impedance and the imaginary part of the first impedance; wherein
the judging means judges that there is a malfunction according to a position indicated by the real part and the imaginary part of the impedance in a rectangular coordinate having one axis of the real value and the other axis of the imaginary value compared to a preset value in the rectangular coordinate;
the judging means judges that there is an occupant by comparing the position indicated by the real part and the imaginary part with a threshold line in the rectangular coordinate;
assuming that the first impedance is Z1, the real part of the first impedance is Re, and the imaginary part of the first impedance is Im, when the resistive component is defined by R, when the capacitive component is defined by C, and when the angular frequency is defined by $\omega$, $1/Z1=Re(1/Z1)+Im(1/Z1)\cdot j=1/R+C\omega\cdot j$;
the real part is an inverse number of a resistive component of the first impedance and the imaginary part is a capacitive component of the first impedance; and
the threshold line is a linear function of the real part and the imaginary part.

16. A seat occupant sensor system as in claim 15, wherein the judging means judges that there is a malfunction in one of the main electrode, the main wire, the guard electrode and the guard wire if the imaginary part of the impedance is smaller than a threshold level.

17. A seat occupant sensor system as in claim 16, wherein the malfunction to be judged includes break down of the main electrode, and break down of the guard wire.

18. A capacitance type seat occupant sensor system of a vehicle having a vehicle body, a seat frame that is fixed to and electrically connected with the vehicle body and a seat fixed to the seat frame, the system comprising:
an electric power source for providing AC voltage;
a main electrode disposed at the seat to form an electric field between the main electrode and the vehicle body;
a main wire connecting the electric power source and the main electrode;
a sub-electrode disposed at a side of the main electrode;
a sub-wire connected with the vehicle body;
a guard electrode disposed between the seat frame and the main electrode to confront the main electrode at a distance;
a guard wire connected to the vehicle body;
means for providing a seat occupant sensing mode, a wet-seat sensing mode and a malfunction sensing mode, the switching mode establishing connection of the guard electrode to have the same potential to provide the seat occupant sensing mode, connecting the sub-electrode with the sub-wire to form an electric field between the main electrode and the sub-electrode to provide the wet seat sensing mode and connecting the guard electrode with the guard wire to form an electric field between the main electrode and the guard electrode to provide the malfunction sensing mode;
means for calculating a first impedance of an electric circuit including the main wire and the main electrode when the providing means provides the seat occupant sensing mode, a second impedance of an electric circuit including the main electrode and the sub-electrode when the providing means provides the wet seat sensing mode and a third impedance of an electric circuit including the main electrode and the guard electrode;
means for calculating the real part and the imaginary part of one of the impedances; and
means for judging a seat occupant, a wet seat and a malfunction based on at least one of the real part of the first, second and third impedances and the imaginary part thereof according to respective positions indicated by the real part and the imaginary part of the first, second and third impedances in a rectangular coordinate having one axis of the real value and the other axis of the imaginary value compared to preset positions in the rectangular coordinate; wherein
the judging means judges that there is the seat occupant by comparing the position indicated by the real part and the imaginary part with a threshold line in the rectangular coordinate;
assuming that the first impedance is Z1, the real part of the first impedance is Re, and the imaginary part of the first impedance is Im, when the resistive component is defined by R, when the capacitive component is defined by C, and when the angular frequency is defined by $\omega$, $1/Z1=Re(1/Z1)+Im(1/Z1)\cdot j=1/R+C\omega\cdot j$;
the real part is an inverse number of a resistive component of the first impedance and the imaginary part is a capacitive component of the first impedance; and
the threshold line is a linear function of the real part and the imaginary part.

19. A seat occupant sensor as in claim 1, wherein if there is an occupant, the real and imaginary parts are plotted above the threshold line in the rectangular coordinate having the ordinate axis of the real value and the abscissa axis of the Imaginary value.

20. A seat occupant sensor as in claim 19, wherein the threshold line is a linear function in which the real part increases as the imaginary part increases.

* * * * *